(12) United States Patent
Toth

(10) Patent No.: US 10,727,550 B2
(45) Date of Patent: Jul. 28, 2020

(54) END OF TRAIN (EOT) SYSTEM HAVING TEMPERATURE CONTROL FOR OPTIMIZED BATTERY CHARGING

(71) Applicant: Progress Rail Services Corporation, Albertville, AL (US)

(72) Inventor: George Toth, Columbia, MD (US)

(73) Assignee: Progress Rail Services Corporation, Albertville, AL (US)

( * ) Notice: Subject to any disclaimer, the term of this patent is extended or adjusted under 35 U.S.C. 154(b) by 220 days.

(21) Appl. No.: 15/810,901

(22) Filed: Nov. 13, 2017

(65) Prior Publication Data

US 2019/0148800 A1  May 16, 2019

(51) Int. Cl.
| | |
|---|---|
| H02J 7/04 | (2006.01) |
| H02J 7/16 | (2006.01) |
| H01M 10/615 | (2014.01) |
| B61L 15/00 | (2006.01) |
| H01M 10/625 | (2014.01) |
| H02J 7/00 | (2006.01) |

(52) U.S. Cl.
CPC ....... *H01M 10/615* (2015.04); *B61L 15/0054* (2013.01); *H01M 10/625* (2015.04); *H02J 7/0047* (2013.01)

(58) Field of Classification Search
USPC .............................................. 320/150–154
See application file for complete search history.

(56) References Cited

U.S. PATENT DOCUMENTS

| | | | |
|---|---|---|---|
| 5,508,126 A | 4/1996 | Braun | |
| 6,002,240 A * | 12/1999 | McMahan | H01M 10/4257 320/150 |
| 6,087,950 A | 7/2000 | Capan | |
| 6,184,656 B1 | 2/2001 | Karunasiri et al. | |
| 6,227,625 B1 | 5/2001 | Gaughan | |
| 7,531,270 B2 | 5/2009 | Buck et al. | |
| 8,182,936 B2 | 5/2012 | Tamura et al. | |
| 8,890,467 B2 | 11/2014 | Almquist et al. | |
| 9,343,784 B2 | 5/2016 | Wayne et al. | |
| 9,448,017 B2 | 9/2016 | Fries et al. | |
| 2006/0110657 A1 * | 5/2006 | Stanton | H01M 2/1072 429/120 |
| 2008/0149781 A1 * | 6/2008 | Root | B60T 17/228 246/167 R |

(Continued)

FOREIGN PATENT DOCUMENTS

| | | |
|---|---|---|
| CN | 205203006 U | 5/2016 |
| CN | 205203008 | 5/2016 |

*Primary Examiner* — Samuel Berhanu
(74) *Attorney, Agent, or Firm* — Brannon Sowers & Cracaft

(57) ABSTRACT

An end of train (EOT) system includes monitoring equipment with a sensor to monitor a pressure of air in a brake mechanism in a railcar, and a power supply having battery cells and a temperature control system for the battery cells. The temperature control system includes a heat sink in heat transference contact with the battery cells, and an electronically controlled heater for the battery cells. The temperature control system includes a temperature sensor, and a control device coupled with the temperature sensor and the electronically controlled heater to vary an output of the heater based on an output of the temperature sensor.

13 Claims, 3 Drawing Sheets

(56) References Cited

U.S. PATENT DOCUMENTS

| | | | |
|---|---|---|---|
| 2008/0185994 A1* | 8/2008 | Altemose | H02J 7/0016 |
| | | | 320/118 |
| 2008/0303528 A1* | 12/2008 | Kim | G01R 31/385 |
| | | | 324/430 |
| 2013/0271082 A1* | 10/2013 | Hayashi | B60L 58/12 |
| | | | 320/118 |
| 2016/0164320 A1* | 6/2016 | Lo | H02J 7/0018 |
| | | | 320/107 |
| 2016/0375888 A1 | 12/2016 | Allwardt | |
| 2017/0324275 A1* | 11/2017 | Horvath | H02J 3/38 |

* cited by examiner

US 10,727,550 B2

END OF TRAIN (EOT) SYSTEM HAVING TEMPERATURE CONTROL FOR OPTIMIZED BATTERY CHARGING

TECHNICAL FIELD

The present disclosure relates generally to an end of train (EOT) system, and more particularly to a power supply for an end of train (EOT) system having batteries and a temperature control system for optimizing battery charging.

BACKGROUND

End of train devices, referred to generally as EOT's, EOTD's, EOT systems, and by similar nomenclature, are in widespread use in the modern rail environment. Functions additionally performed by personnel in a caboose or the like are automated to varying degrees, including producing a visible blinker signal at the end of the train, location tracking, and, perhaps most importantly, informing the front of train systems and personnel, as to brake system status at the last railcar in a train.

Most modern railcars employ pneumatic brakes coupled together in a series arrangement car-to-car, and supplied with pressurized actuating air from a compressor onboard the locomotive or otherwise near the front of the train. Among other things, ensuring that sufficient pressure is available for brake actuation at the last railcar can enable slowing or stopping the train in a desired manner, generally uniform application of braking force throughout the train, and avoiding the use of emergency brakes or other problems.

The hardware and functionality of end of train devices is commonly situated in a portable housing that can be attached to suitable mounts at the back end of the train. While certain charging or power generating strategies have been proposed, most end of train devices rely upon batteries for powering the various electrical components. Traditional and conventional batteries in such applications such as lead acid batteries tend to be heavy, weighing dozens of pounds, sometimes requiring the engineer or other personnel to lift and carry the device to and from a station for charging or swapping with another end of train device, or for various other purposes. U.S. Pat. No. 5,267,471 proposes a power supply for an EOT unit where an electrical generator driven by air from the train airbrake pipe provides power to the EOT unit. While the '473 patent proposes strategies that may have certain advantages, there is ample room for continued and alternative developments in this field.

SUMMARY OF THE INVENTION

In one aspect, an end of train (EOT) system includes monitoring equipment having a pressure sensor structured to produce a pressure signal indicative of a pressure of air in a brake mechanism in a railcar, and a transmitter structured to transmit a brake data signal that is based on the pressure signal. The system further includes a power supply for the monitoring equipment including a plurality of battery cells, and a temperature control system for the plurality of battery cells. The temperature control system includes a heat sink in heat transference contact with each of the plurality of battery cells, and an electronically controlled heater for the plurality of battery cells. The temperature control system further includes a temperature sensor structured to produce a battery temperature signal, and a control device coupled with each of the temperature sensor and the electronically controlled heater and structured to vary an output of the electronically controlled heater based on the battery temperature signal.

In another aspect, a power supply pack for powering electrical equipment in an end of train (EOT) system includes a plurality of battery cells, and a temperature control system for the plurality of battery cells. The temperature control system includes an electronically controlled heater for the plurality of battery cells, a temperature sensor coupled with the plurality of battery cells and structured to produce a battery temperature signal, and a heat sink. The heat sink supports each of the plurality of battery cells, the electronically controlled heater, and the temperature sensor, and the heat sink is positioned in heat transference contact with each of the plurality of battery cells.

In still another aspect, a temperature control system for a power supply pack in an end of train (EOT) system includes a heat sink having a heat sink plate and a plurality of heat sink sleeves attached to the heat sink plate and structured to receive a plurality of battery cells. The temperature control system further includes a printed circuit board mounted to the heat sink plate and including temperature control circuitry. The temperature control system further includes a temperature sensor electrically connected with the temperature control circuitry, an electronically controlled heater electrically connected with the temperature control circuitry, and an electrical connector electrically connected with the temperature control circuitry.

DETAILED DESCRIPTION

Figure 1:
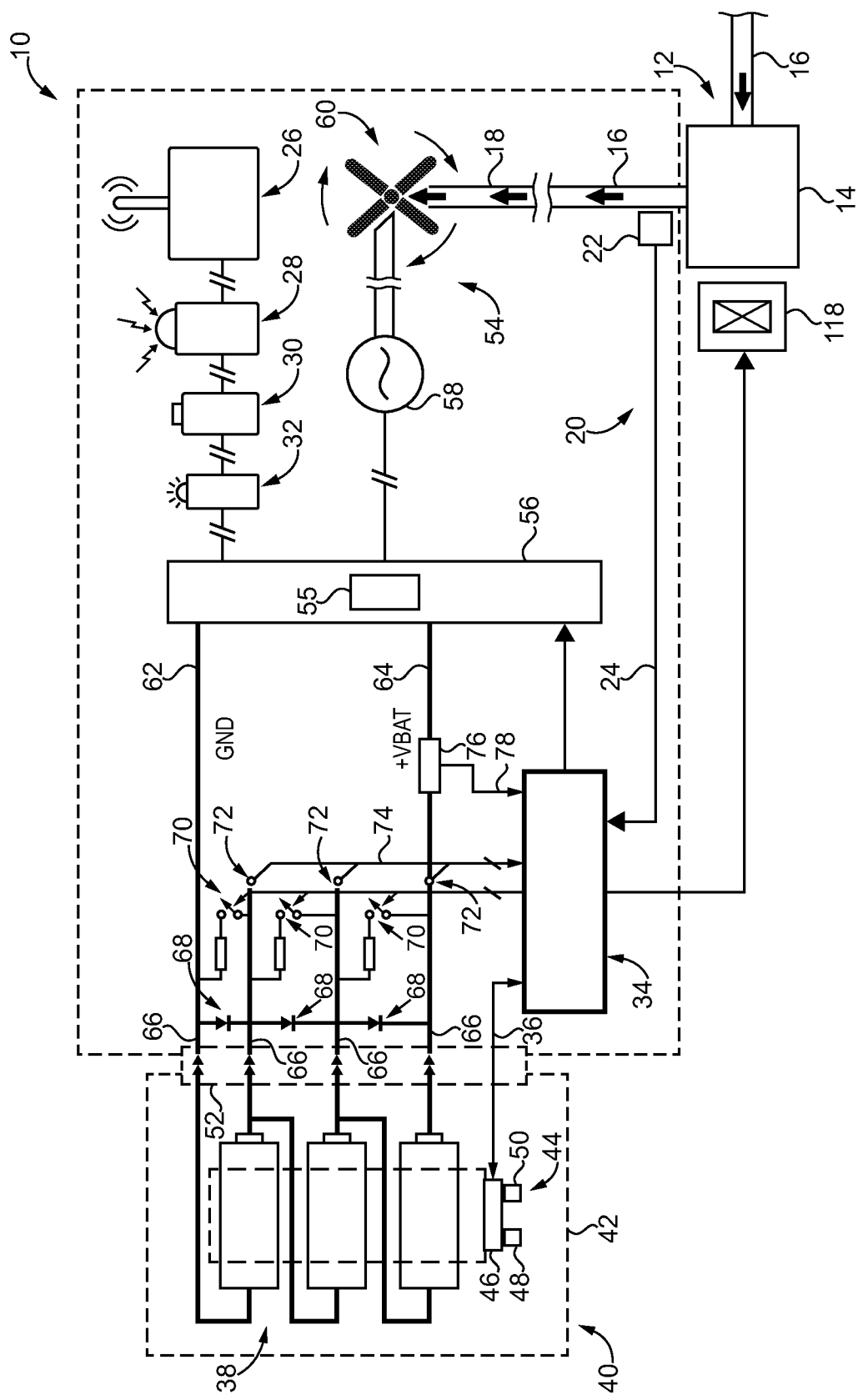
FIG. 1 is a schematic view of an end of train (EOT) system, according to one embodiment.

Referring to FIG. 1, there is shown an end of tram (EOT) system 10, according to one embodiment. End of train (EOT) system 10 (hereinafter "system 10") is structured for monitoring of a number of operational and or environmental parameters at the end of a train, such as at the last railcar, in a generally conventional manner. A brake system 12 including a brake mechanism 14, such as a pneumatically actuated rail car wheel brake, for instance, may be connected with a brake pipe 16 or the like that conveys pressurized air from a compressor and/or reservoir at another location onboard the train, such as onboard the locomotive, also in a generally conventional manner. Brake pipe 16 provides a supply of pressurized air to brake mechanism 14, and may be coupled with an outlet pipe 18 or the like further discussed herein. An emergency brake 118 which could be mechanically actuated, or electrically actuated, for example, may be coupled with brake mechanism 14 and utilized in the event of a loss of actuating air pressure in brake pipe 16, or if another need for emergency braking arises. Some or all of the components of system 10 can be mounted upon the last railcar, but potentially at another location on the train, in a manner that enables personnel to detach some or all of system 10 and swap out for a substitute end of train (EOT) system, or parts thereof, as further discussed herein.

System 10 further includes a power supply pack or power supply 40 for powering electrical equipment in system 10. In the illustrated embodiment, system 10 includes monitoring equipment 20 having a pressure sensor 22 structured to produce a pressure signal 24 indicative of a pressure of air within or available to brake mechanism 14 in the subject railcar. Monitoring equipment 20 also includes a transmitter 26 structured to transmit a brake data signal that is based on the pressure signal. Transmitter 26 can transmit analog signals at any suitable and available radio frequency, consistent with conventional practices, or could utilize other frequencies or data signal transmission techniques to various ends. In the event of a pressure of air in brake mechanism 11 that is too low, a pressure of air in brake mechanism 11 that is too high, an unexpected change in the pressure of air, or some other eventuality, transmitter 26 can communicate the occurrence of the pressure level or other pressure phenomenon to an operator and/or equipment at the front of the train. Those skilled in the art will be familiar with the general range of typical train runs, for instance approximately 36 hours. It is contemplated that system 10 can be equipped for operation for at least 36 continuous hours without any need for battery charging, battery swapping, or other servicing. System 10 will nevertheless typically include equipment that exploits the availability of pressurized an for battery changing purposes.

To this end, system 10 can include a charging power supply 54 having an air-driven rotating element such as a microturbine 60, coupled with an electrical generator 58. In an implementation, pressurized air by way of outlet pipe 18 causes microturbine 60 to rotate to power generator 58. It will be appreciated that another type of battery charging equipment, such as solar battery charging equipment, a wind turbine, or battery charging equipment coupled with rotating components in the associated railcar, for instance, might be used. As will be further apparent from the following description, system 10 is uniquely configured for robust field service in a lightweight and readily handled package, while also providing temperature control and battery charging capabilities adapted to provide useable battery life at least as long as an expected field service life of system 10 itself, which is typically five to ten years with some used even longer.

Pressure sensor 22 can include any suitable sensor capable of measuring, inferring, estimating, or otherwise having an electrical state or a mechanical state that is responsive to a pressure of air in brake mechanism 14 or changes in the pressure of air. In addition to monitoring air pressure, system 10 can also include equipment such as a GPS receiver 28, a twilight sensor 30, and a high visibility marker light (HVM) or blinker 32 or the like. Blinker 32 can operate in a generally conventional manner to provide a flashing, blinking, or continuously or intermittently illuminated signal identifying the end of the train. Twilight sensor 30 can monitor ambient light, levels to enable blinker 32 to be turned on, turned off, or otherwise vary in operation, such as relative level of illumination, or for purposes of varying the operation of other equipment in system 10.

System 10 further includes a power supply 40 for monitoring equipment 20 and having a plurality of battery cells 38 and a temperature control system 44 for battery cells 38. Battery cells 38 can include any suitable battery type, but in a practical implementation strategy will include a relatively lightweight battery material such as a lithium ion material and in particular might be LiMnCo cells although the present disclosure is not thereby limited. Battery cells 38 can be coupled together in series and also electrically connected with other components of system 10 by way of an electrical connector 52, such as a D15 multi-pin connector or the like, to power blinker 32, twilight sensor 30, GPS receiver 28, transmitter 26, and potentially still other equipment in system 10. Connector 52 also electrically connects battery cells 38 with charging power supply 54 as further discussed herein.

Temperature control system 44 can include a heat sink 46 in heat transference contact with battery cells 38, and an electronically controlled heater 48 for battery cells 38. System 10 also includes electrical circuitry, including battery charging circuitry 56 that is coupled with a ground node 62 and a main battery supply node 64, and positioned electrically between charging power supply 54 and battery cells 38. Connector 52 may be positioned electrically between circuitry 56 and battery cells 38, such that power supply 40 and other components of system 10 can be decoupled from one another by disconnecting connector 52, the significance of which will be further apparent from the following description.

Temperature control system 44 further includes a temperature sensor 50 structured to produce a battery temperature signal 36, and a control device or electronic control unit 34 that receives battery temperature signal 36 and is coupled with each of temperature sensor 50 and electronically controlled heater 48 and structured to vary an output of electronically controlled heater 48 based on battery temperature signal 36. Varying output of electronically controlled heater 48 can include switching heater 48 on, switching heater 48 off, or varying a relative power output of heater 48 within a range of available power output. Control device 34 can include any suitable computerized control device, such as a microcontroller, and will typically be structured to receive pressure signal 24 from sensor 22, and control transmitter 26 to output the brake data signal based on pressure signal 24. Transmitter 26 will typically transmit a brake data signal approximately once a minute in a quiescent pressure state and as rapidly as once a second during rapid changes in brake pipe pressure, however, the present disclosure is not thereby limited and greater or lesser transmitting frequency could be used. Transmitter 26 can be a transceiver in some embodiments, capable of receiving and acting upon commands to take certain actions such as to transmit brake pressure data, transmit data relating to other conditions or states monitored by or controlled by system 10, or even commands to vary the operation of devices not a part of system 10 as such. Control device 34 can also receive, interpret, and act upon battery temperature signal 36 for purposes of controlling temperatures of battery cells 38 during discharging, but also during charging as further discussed herein. Circuitry 56 can also include an actively controlled battery charger 55 that is controlled by control device 34 based upon, battery temperature, battery charge state, and a number of other factors, as further discussed herein.

Also shown in FIG. 1 are a plurality of battery connection nodes 66, and a plurality of diodes 68 coupled between battery connection node 66. Battery connection nodes 66 can be part of or directly coupled with connector 52. A plurality of charge balancers 70, such as passive charge balancers or actively controlled charge balancers, may be coupled between battery connection nodes 66. Diodes 68 can include Schottky diodes structured to control charge flow, and providing connections that enable power supply 40 to continue to supply power to system 10 in the event of failure or degradation of some but less than all of battery cells 38. Charge balancers 70 assist in enabling charge state of the individual battery cells 38 to be substantially equalized. Control device 34 can be structured to open or close switching elements in charge balancers 70 so that one of battery cells 38 that is more fully charged than a second one of battery cells 38 can be electrically connected to the second one to assist in charging. Other charge balancing techniques and/or hardware to assist in equalizing charge state could be employed without departing from the scope of the present disclosure. Further still, a plurality of voltage sensing probes 72 may be electrically connected by way of connector 52 with battery cells 38 and enable voltage or voltage properties of each of battery cells 38 to be individually monitored. In a practical implementation strategy, a sensing line 74 connects between voltage probes 72 and control device 34, and control device 34 is structured to calculate internal impedances of each of battery cells 38 for purposes of providing a suitable charging current with the aim of equalizing charge state of battery cells 38, as well as performing the charging of battery cells 38 in a manner that is as consistent and uniform as practicable. Battery charger 55 within circuitry 56 is also shown in FIG. 1. It can further be noted from FIG. 1 that a current sensor 76 is coupled with supply node 64, and in communication with control device 34 by way of a current sensing line 78 such that actual charging currents produced by battery charger 55 can be directly observed.

Figure 2:
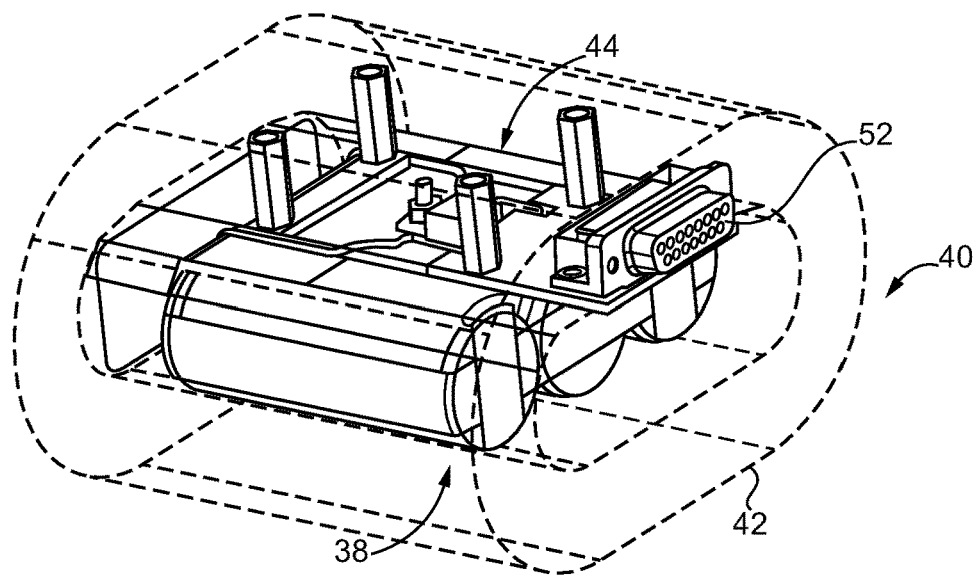
FIG. 2 is a diagrammatic view of a power supply pack for an end of train (EOT) system, according to one embodiment.
Figure 3:
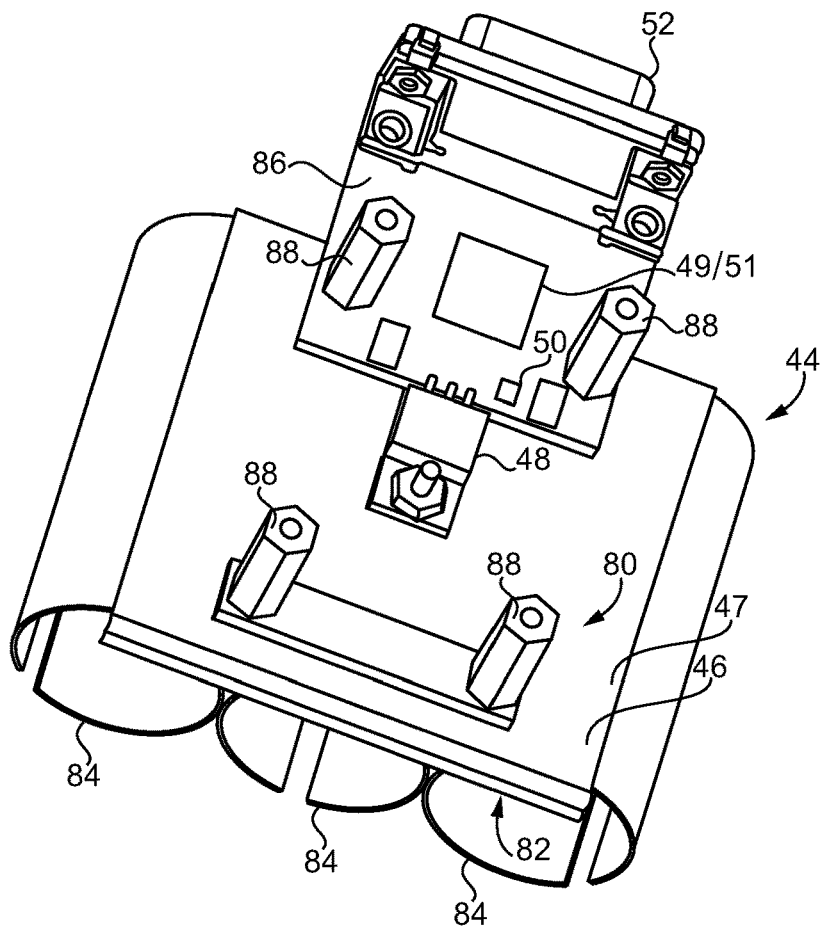
FIG. 3 is a diagrammatic view of components in a temperature control system for a power supply pack as in FIG. 2, according to one embodiment.

Referring also now to FIG. 2, there is shown a diagrammatic view of power supply or power supply pack 40, with a housing 42 shown in phantom lines. In the illustrated embodiment housing 42 is formed of an insulating material such as a polyurethane insulation or similar thermally insulating material, and encapsulates battery cells 38, heat sink 46, electronically controlled heater 48, and temperature sensor 50. It can be seen that connector 52 protrudes from housing 42 and is positioned at least partially outside of housing 42. FIG. 3 illustrates certain components as they might appear removed from housing 42, and illustrating certain features in further detail. As shown in FIG. 3, heat sink 46 includes a heat sink plate 47 having a first side 80 and a second side 82. A plurality of parallel heat sink sleeves 84 are positioned upon and attached to second side 82. Other battery cell arrangement, such as a plurality of battery cells arranged in a square pattern, a rectangular pattern, or still others could be employed. A plurality of other components, including a printed circuit board or battery board 86, temperature sensor 50, and electronically controlled heater 48 are positioned upon and attached to first side 80. It can be seen that board 86 projects outwardly from an outer perimeter of heat sink plate 47. A plurality of standoff pins of low thermal conductivity 88 or the like project from heat sink plate 47, and can assist in positioning and spacing components of power supply pack 40 within housing 42. In an implementation, electronically controlled heater 48 includes a transistor. In a further refinement, the transistor includes a field effect (FET) transistor, and is structured to dissipate heat directly into heat sink 46, as further discussed herein. It should nevertheless be appreciated that other heater design and heater control strategies could be implemented within the scope of the present disclosure. For instance, a resistive heater could be employed having a resistor that is switched on or off as needed Board 86 further includes temperature control circuitry 49 and temperature control circuitry 51, further discussed herein, thereon.

Figure 4:
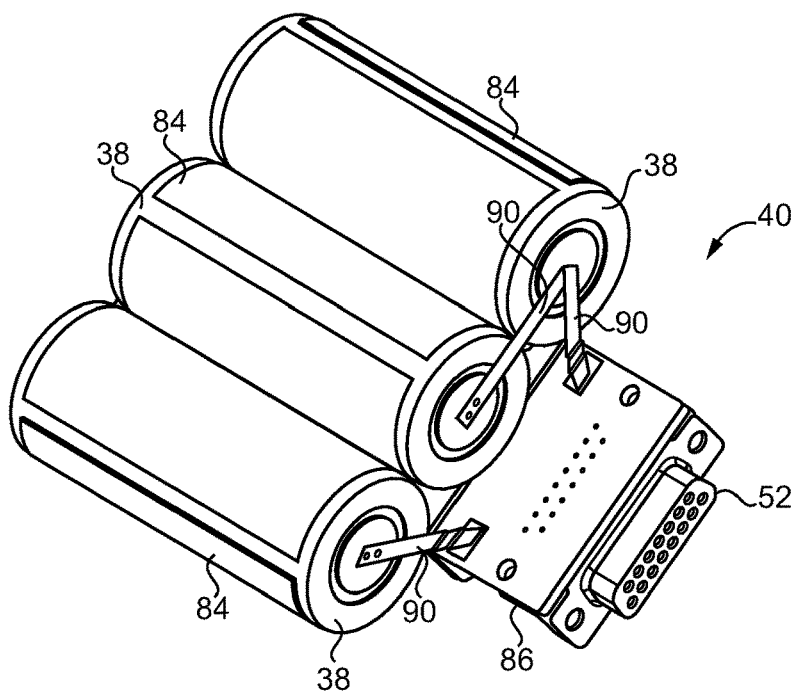
FIG. 4 is a diagrammatic view of components in a power supply pack as in FIG. 2, according to one embodiment.

Referring also to FIG. 4, there are shown components of power supply pack 40 of FIG. 2 and FIG. 3 with battery cells 38 received within sleeves 84. Battery connection straps 90 are shown electrically connected across battery terminals 114, and coupled with board 86. Battery cells 38 can be further supported within sleeves 84 by being taped, approximately as depicted in FIG. 2. From the foregoing description and accompanying illustrations, it will be appreciated that heat sink 46 supports battery cells 38, electronically controlled heater 48, temperature sensor 50, and other components. Heat sink 46 can be positioned in heat transference contact with each of battery cells 38, for example, by way of direct physical abutment or with a suitable intervening thermally conductive grease, thermally conductive tape or other material.

Figure 5:
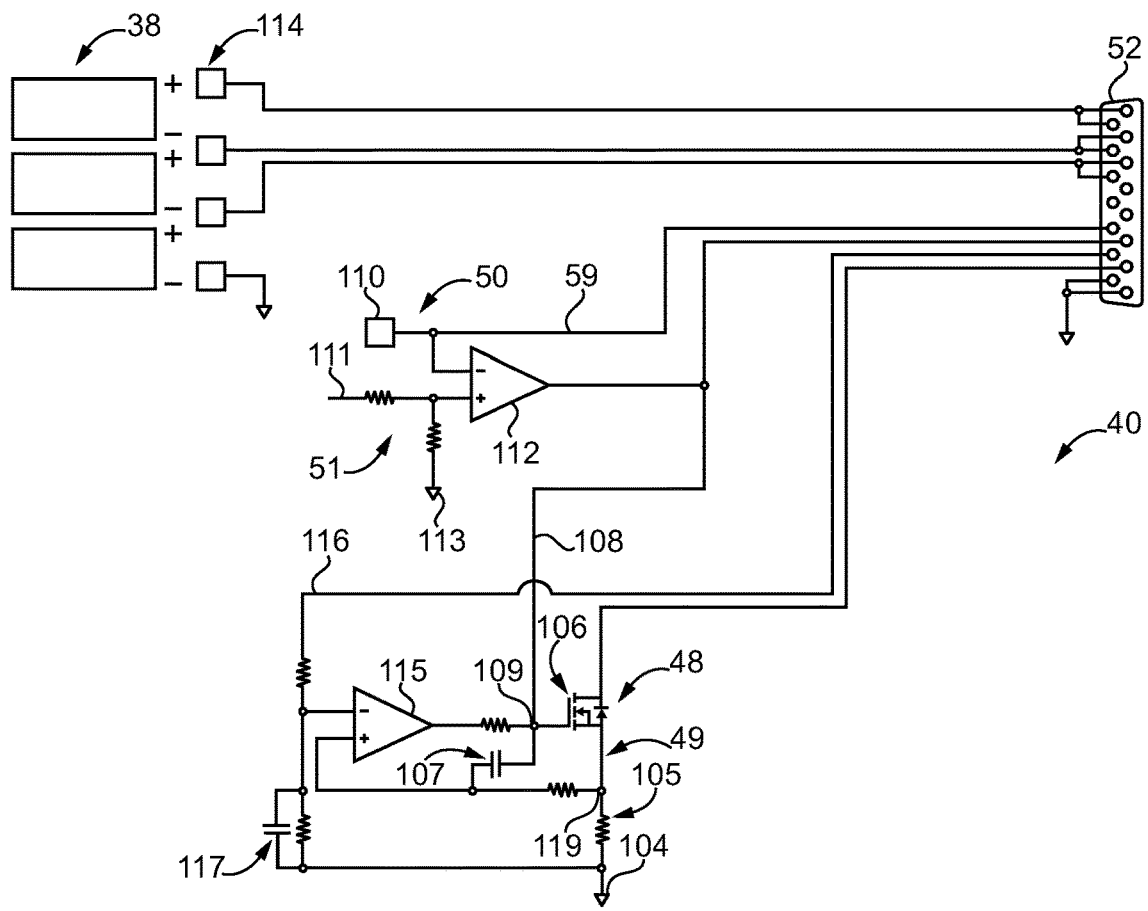
FIG. 5 is a schematic view of electrical circuitry in a power supply pack as in FIG. 2, according to one embodiment.

Referring now to FIG. 5, there are shown electronic components of power supply pack 40 in more detail, illustrating battery cells 38 and battery terminals 114 for battery cells 38 coupled with connector 52. Also shown is temperature control circuitry 49 associated with heater 48, and temperature control circuitry 51 associated with temperature sensor 50. In the illustrated embodiment, temperature control circuitry 51 includes a reference voltage input 111, a ground 113, and a comparator 112 or other signal comparing device. A temperature probe 110 may be in heat transference contact with heat sink 46, or otherwise positioned or structured to monitor a temperature of heat sink 46. Comparator 112 may have an output that flips from a first output state to a second output state if a desired predefined temperature of heat sink 46 is exceeded, disabling further operation of electronically controlled heater 48 as discussed below, and preventing overheating of heat sink 46 and associated components. Temperature probe 110 also outputs a signal indicative of a temperature of heat sink 46 by way of a signaling line 59 to connector 52, for receipt and processing by control unit 34, for example.

A control line 108 connects between temperature control circuitry 51 and temperature control circuitry 49. As noted above, electronically controlled heater 48 can include a transistor, such as an N-channel Mosfet transistor having a gate 106, and structured to operate in a current mode. It should also be appreciated that the term transistor is used broadly herein in reference to any suitable device within the class of electronic component generally referred to as transistors, including bipolar junction transistors (BJT's), field effect transistors (FET's), various subtypes of these, and still others. Another control line 116 extends between connector 52 and an operational amplifier 115, and is structured to couple temperature control circuitry 49 with control unit 34. Operational amplifier 115 can have an output that varies depending upon a signal from control device 34 transmitted by way of control line 116, in comparison to a reference signal from a node 119 that is located electrically between a resistor 105 and electronically controlled heater 48. Temperature control circuitry 49 also includes a ground 104, a capacitor 107, a capacitor 117, and potentially additional circuit elements (not numbered), enabling current to flow through electronically controlled heater 48, and operational amplifier 115 to produce an output at node 109 that varies to control the current that flows through electronically controlled heater 48 at a desired setpoint. Voltage developed at node 109 thus defines a magnitude of current though resistor 105, and also the amount of heat dissipated by way of electronically controlled heater 48 to heat sink 46. Electronically controlled heater 18 can be structured to dissipate heat directly into heat sink 46. Therefore, operational amplifier 115 acts as a current control mechanism for electronically controlled heater 48, and is configured to turn off in the event of too high a temperature of heat sink 46 based on flipping the output state of comparator 112. It should further be appreciated that, while a transistor operating in current mode and in heat transference contact with heat sink to provides a practical implementation strategy, other types of heaters including more than a single transistor, a transistor(s) in switching mode, one or more transistors plus a plurality of resistors, or potentially one or more resistors alone could be implemented without departing from the scope of the present disclosure. Heat sink 46 and its component parts can all be made of a relatively highly thermally conductive material such as copper or another metallic material.

INDUSTRIAL APPLICABILITY

Trains operate in relatively dynamic temperature conditions. Those skilled in the art will appreciate that changing weather patterns, precipitation, changing solar gain over the course of a period of service, and of course long-distance travel can change the conditions to which an end of train (EOT) system is subjected. As a result, system 10, and notably battery cells 38, can experience temperature swings over the course of a few hours or even less that are relatively extreme. Nighttime temperatures in a mountain desert environment can be well below freezing, and a train can travel from such an environment an ocean coast that might be 75 or 100 degrees Fahrenheit warmer over the course of a single day or even a few hours. Attempting to change batteries, or maintain battery charge, in a prescribed manner when exposed to such dynamic temperature conditions can be quite challenging, especially with regard to lithium ion based battery systems.

Along these lines, differences in temperature amongst a plurality of battery cells can affect the behavior of such battery cells during charging, meaning that battery cells at different temperatures can charge at different rates, discharge at different rates, and therefore charge or discharge to different energy levels even when exposed to the same battery changing or in-service electrical conditions. It is generally undesirable to have different charge levels of battery cells in the same power supply pack for a number of reasons. For instance, particularly with certain lithium ion battery materials it is undesirable and can even degrade the battery cells or cause breakdown of integral membranes to discharge a battery cell completely. In a power supply pack with batteries having different charge levels, discharging of the power supply pack as a whole will need to be stopped if any one battery cell drops to a charge level that risks degradation or damage. In the case of an end of train (EOT) system power supply pack, any limitation on the extent to which battery cells can be discharged potentially limits the field service life of a power supply pack between charges. According to the present disclosure, temperature control system 44 includes a common heat sink 46 that enables temperatures of battery cells 38 to be as close to exactly the same as is practicable. Moreover, by implementing charge balancers 70, battery cells 38 can be charged to substantially identical charge levels. As also noted above, control device 34 can operate battery charger 55 to separately and independently supply electrical charging power to individual battery cells 38 in a manner that accounts for internal impedances that may differ among the plurality of battery cells 38.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An end of train (EOT) system comprising:
   monitoring equipment including a pressure sensor structured to produce a pressure signal indicative of a pressure of air in a brake mechanism in a railcar, and a transmitter structured to transmit a brake data signal that is based on the pressure signal;
   a power supply for the monitoring equipment including a plurality of battery cells, and a temperature control system for the plurality of battery cells;
   the temperature control system including a heat sink in heat transference contact with each of the plurality of battery cells, and including a heat sink plate and a plurality of heat sink sleeves attached to the heat sink plate and receiving the plurality of battery cells, a printed circuit board mounted to the heat sink plate and including temperature control circuitry, an electronically controlled heater for the plurality of battery cells electrically connected with the temperature control circuitry, and an electrical connector electrically connected with the temperature control circuitry;
   the temperature control system further including a temperature sensor electrically connected with the temperature control circuitry and structured to produce a battery temperature signal, a control device coupled with each of the temperature sensor and the electronically controlled heater and structured to vary an output of the electronically controlled heater based on the battery temperature signal, and a charge balancer structured to electrically connect a first one of the plurality of battery cells to a second one of the plurality of battery cells; and
   a housing formed of an insulating material and encapsulating the plurality of battery cells, the heat sink, the electronically controlled heater, the printed circuit board, and the temperature sensor; and
   the electronically controlled heater is attached to the heat sink and structured to dissipate heat directly into the heat sink.

2. The system of claim 1 wherein the electronically controlled heater is a transistor.

3. The system of claim 1 wherein the heat sink includes a plurality of heat sink sleeves receiving the plurality of battery cells.

4. An end of train (EOT) comprising:
   monitoring equipment including a pressure sensor structured to produce a pressure signal indicative of a pressure of air in a brake mechanism in a railcar, and a transmitter structured to transmit a brake data signal that is based on the pressure signal;
   a power supply for the monitoring equipment including a plurality of battery cells, and a temperature control system for the plurality of battery cells;
   the temperature control system including a heat sink in heat transference contact with each of the plurality of battery cells, and an electronically controlled heater for the plurality of battery cells in heat transference contact with the heat sink;

the temperature control system further including a temperature sensor structured to produce a battery temperature signal, and a control device coupled with each of the temperature sensor and the electronically controlled heater and structured to vary an output of the electronically controlled heater based on the battery temperature signal;

the heat sink further includes a plurality of heat sink sleeves receiving the plurality of battery cells;

the heat sink further includes a heat sink plate, and the electronically controlled heater is positioned upon a first side of the heat sink plate and the plurality of heat sink sleeves are positioned upon and attached to a second side of the heat sink plate that is opposite to the first side; and the system further comprising a housing formed of an insulating material, and the housing encapsulating the plurality of battery cells, the heat sink, the electronically controlled heater, and the temperature sensor.

5. The system of claim 1 wherein the electrical circuitry includes a plurality of battery connection nodes, and a plurality of charge balancers coupled between the plurality of battery connection nodes.

6. The system of claim 5 wherein the electrical circuitry further includes a plurality of diodes coupled between the plurality of battery connection nodes.

7. The system of claim 5 wherein the control device is coupled with each of the plurality of battery connection nodes, and structured to calculate an internal impedance of each one of the plurality of battery cells.

8. A power supply pack for powering electrical equipment in an end of train (EOT) system, the power supply pack comprising:
 a plurality of battery cells;
 a temperature control system for the plurality of battery cells, the temperature control system including:
  an electronically controlled heater for the plurality of battery cells;
  a temperature sensor coupled with the plurality of battery cells and structured to produce a battery temperature signal; and
  a heat sink supporting each of the plurality of battery cells, the electronically controlled heater, and the temperature sensor, and the heat sink being positioned in heat transference contact with each of the plurality of battery cells; and
 a housing encapsulating the plurality of battery cells, the heat sink, and the electronically controlled heater;
 wherein the heat sink includes a heat sink plate, and a plurality of heat sink sleeves attached to the heat sink plate and receiving the plurality of battery cells the plurality of heat sink sleeves are attached to the heat sink plate upon a first side, and the electronically controlled heater is attached to the heat sink plate upon a second side of the heat sink plate opposite the first side;
 a printed circuit board coupled with each of the electronically controlled heater and the temperature sensor, and further including a multi-pin electrical connector attached to the printed circuit board and electrically connected with each of the plurality of battery cells, and with each of the electronically controlled heater and the temperature sensor;
 wherein the housing is formed of an insulating material, and the housing encapsulates the printed circuit board, and the temperature sensor, and the multi-pin connector being positioned at least partially outside of the housing.

9. The power supply pack of claim 8 wherein the electronically controlled heater includes a transistor structured to dissipate heat directly into the heatsink.

10. A temperature control system for a power supply pack in an end of train (EOT) system comprising:
 a heat sink including a heat sink plate and a plurality of heat sink sleeves attached to the heat sink plate and structured to receive a plurality of battery cells;
 a printed circuit board mounted to the heat sink plate and including temperature control circuitry;
 a temperature sensor electrically connected with the temperature control circuitry;
 an electronically controlled heater electrically connected with the temperature control circuitry;
 an electrical connector electrically connected with the temperature control circuitry;
 a charge balancer structured to electrically connect a first one of the plurality of battery cells to a second one of the plurality of battery cells;
 a housing formed of an insulating material and encapsulating the plurality of battery cells, the heat sink, the electronically controlled heater, the printed circuit board, and the temperature sensor; and
 the electrical connector including a multi-pin connector attached to the printed circuit board and being positioned at least partially outside of the housing.

11. The system of claim 10 wherein the electronically controlled heater includes a transistor.

12. The system of claim 11 wherein the electronically controlled heater is positioned upon a first side of the heat sink plate, and the plurality of heat sink sleeves are positioned upon and attached to a second side of the heat sink plate that is opposite to the first side.

13. The system of claim 10 wherein each of the temperature sensor and the electronically controlled heater is mounted to the printed circuit board.

* * * * *